US007743257B2

(12) United States Patent
Rabeler

(10) Patent No.: US 7,743,257 B2
(45) Date of Patent: Jun. 22, 2010

(54) SECURITY PROCESSOR WITH BUS CONFIGURATION

(75) Inventor: Thorwald Rabeler, Sunnyvale, CA (US)

(73) Assignee: NXP B.V., Eindhoven (NL)

( * ) Notice: Subject to any disclaimer, the term of this patent is extended or adjusted under 35 U.S.C. 154(b) by 2334 days.

(21) Appl. No.: 10/183,716

(22) Filed: Jun. 27, 2002

(65) Prior Publication Data

US 2004/0003277 A1   Jan. 1, 2004

(51) Int. Cl.
*G06F 11/30* (2006.01)
*H04L 29/06* (2006.01)

(52) U.S. Cl. ...................... 713/189; 713/164
(58) Field of Classification Search .............. 726/2, 726/9; 713/164, 166, 189, 2; 711/154; 235/380
See application file for complete search history.

(56) References Cited

U.S. PATENT DOCUMENTS

| 5,509,073 | A | * | 4/1996 | Monnin ................. 380/229 |
| 5,509,703 | A | * | 4/1996 | Lau et al. .............. 292/1 |
| 6,038,667 | A | | 3/2000 | Helbig, Sr. |
| 6,061,794 | A | | 5/2000 | Angelo et al. |
| 6,101,586 | A | * | 8/2000 | Ishimoto et al. ......... 711/163 |
| 6,212,635 | B1 | | 4/2001 | Reardon |
| 6,363,480 | B1 | * | 3/2002 | Perlman ................ 713/164 |
| 6,668,326 | B1 | * | 12/2003 | Sella et al. ............. 726/6 |
| 7,178,031 | B1 | | 2/2007 | Seger |
| 2002/0023186 | A1 | | 2/2002 | Kim |
| 2003/0221030 | A1 | | 11/2003 | Pontius et al. |

FOREIGN PATENT DOCUMENTS

| CN | 1265493 A | 9/2000 |
| CN | 1331824 A | 1/2002 |
| CN | 1387638 A | 12/2002 |
| EP | 0 718 773 A1 | 6/1996 |
| JP | 7-104882 A | 4/1995 |
| WO | 00/23960 A1 | 4/2000 |
| WO | 00/43855 A1 | 7/2000 |
| WO | 2004/107181 A1 | 12/2004 |

OTHER PUBLICATIONS

Search Report for Int'l Patent Appln. PCT/IB03/02884 (Nov. 26, 2003).

* cited by examiner

*Primary Examiner*—Emmanuel L Moise
*Assistant Examiner*—Ali S Abyaneh

(57) ABSTRACT

A security subsystem controls the data transfer rights among components of a secured system via a common bus. The security subsystem includes a secure block that is coupled to an access controller, preferably via a hard-wired connection to the controller. This secure block exclusively controls the access rights among components, and can effectively isolate security functions and data from the main processor. Because the security is provided via access control to components or subsets of components via a common bus, an efficient and effective integration of the security subsystem within the secured system can be achieved.

7 Claims, 1 Drawing Sheet

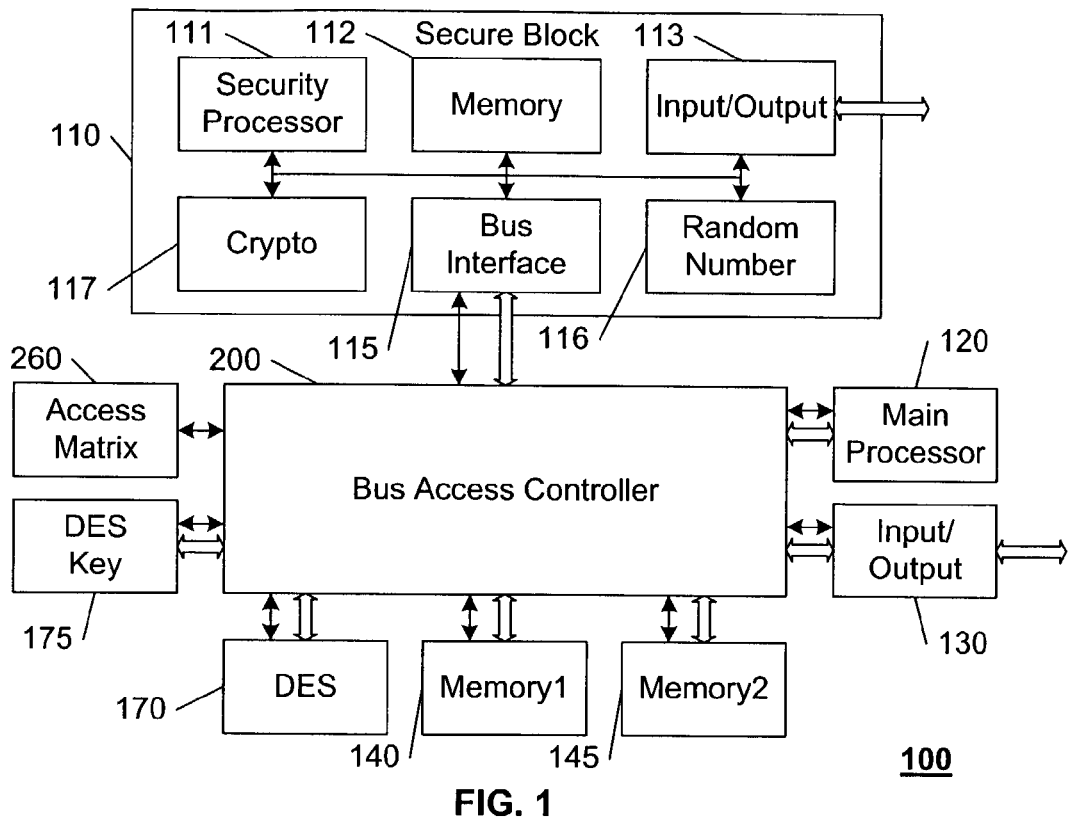
FIG. 1
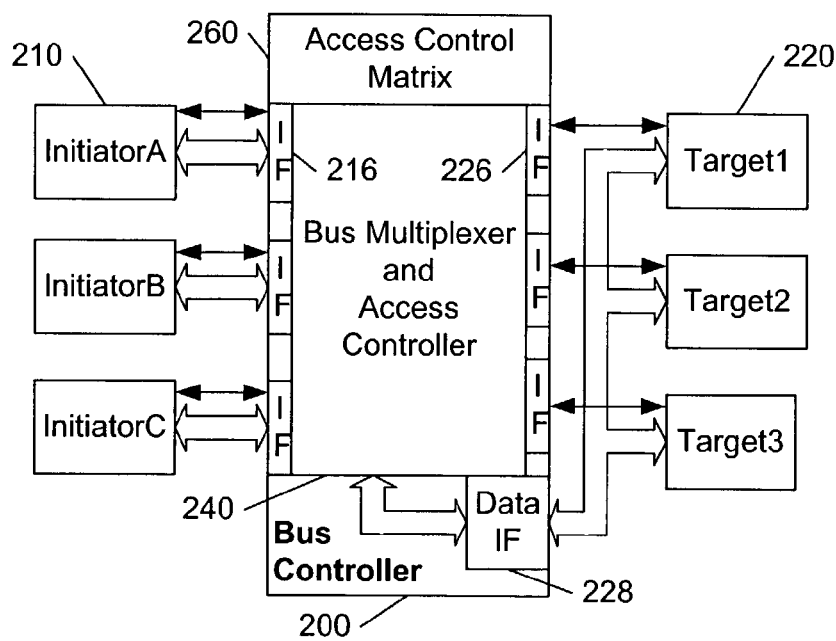
FIG. 2
|   | 0 | 1 | 2 | 3 |
|---|---|---|---|---|
| A | a | a | a | - |
| B | - | r | a | w |
| C | - | - | a | - |
260
FIG. 3

SECURITY PROCESSOR WITH BUS CONFIGURATION

BACKGROUND OF THE INVENTION

1. Field of the Invention

This invention relates to the field of electronic systems, and in particular to an electronic system with a security co-processor that isolates select blocks from a main processor, thereby isolating the select blocks from a potential compromise of the main processor.

2. Description of Related Art

The need for security systems to protect electronic systems from hackers, and/or the viruses that some hackers produce, continues to increase. In the realm of entertainment systems, hackers have targeted such devices as cable or satellite "converter boxes", in an attempt to steal the services provided without paying the required access fees. In the realm of computing systems, hackers continually attempt to access and/or modify information in other computers, either directly or via the dissemination of a virus program. As advances are made in home-automation and seamless integration of consumer equipment, the distinction between a "computing system", an "entertainment system", an "appliance network", and so on, will become increasingly blurred, and virtually all or most of one's collection of electronic devices will be susceptible to hackers.

In a typical security system, such as used for preventing access to select content material from a television converter box, a security device, such as a "smart card" is used to authenticate a user's action, such as the purchase of the content material. Typically, the smart card generates a cryptographic key that is communicated to a decryption device that decrypts the content material using this key. Also typically, to allow for modular design practices, the smart card device communicates this key to the decryption device via a common bus, generally under the control of a processor that also controls other functions within the converter box. A corruption of the code used by the processor can compromise the security provided by the smart card, for example, by copying the key and distributing it to users who have not purchased the material.

In other security systems, the security device is isolated from the common bus, and from the common processor. Such systems, however, are generally more costly, requiring direct point-to-point connections, and less versatile, because of the direct connection between particular devices. Also, because these systems are purposefully isolated from the common processor, these systems are generally not well integrated into the common system, often, for example, having a different user interface from the interface provided by the common processor. A common example of such a system is the maintenance systems common on a mainframe computer system, wherein remote diagnostics occur via a secure channel. In the personal computer field, or consumer electronics field, secure coprocessors are used to provide secure processes and procedures, but are purposely provided a minimal interface with the main processor of the computer or consumer device.

BRIEF SUMMARY OF THE INVENTION

It is an object of this invention to provide a security system that allows the transfer of secure information via a common system bus. It is a further object of this invention to provide a security system that isolates select function and data from a main processor, while allowing for the integration of other functions and data with the main processor. It is a further object of this invention to provide a secure communications channel via a common bus.

These objects and others are achieved by providing a security subsystem that controls the data transfer rights among components of a secured system via a common bus. The security subsystem includes a secure block that is coupled to an access controller, preferably via a hardwired connection to the controller. This secure block exclusively controls the access rights among components, and can effectively isolate security functions and data from the main processor. Because the security is provided via access control to components or subsets of components via a common bus, an efficient and effective integration of the security subsystem within the secured system can be achieved.

BRIEF DESCRIPTION OF THE DRAWINGS

The invention is explained in further detail, and by way of example, with reference to the accompanying drawings wherein:

FIG. 1 illustrates an example block diagram of a secured system in accordance with this invention.

FIG. 2 illustrates an example access controller for use in a security system in accordance with this invention.

FIG. 3 illustrates an example access control matrix for identifying access rights between devices in a secured system in accordance with this invention.

Throughout the drawings, the same reference numerals indicate similar or corresponding features or functions.

DETAILED DESCRIPTION OF THE INVENTION

FIG. 1 illustrates an example block diagram of a secured system 100 in accordance with this invention. The system 100 is illustrated as comprising a conventional main processor 120, an input/output component 130, memory elements 140, 145, and decrypting elements 170, 175. These items are illustrated to represent example components of a conventional processing system, although the principles of this invention are not limited by the particular components comprising the system that is being secured. That is, the items 120-175 of the system 100 are intended to represent any processing system wherein a main processor 120 effects the primary function of the system, using ancillary elements and devices 130-175, as required.

In accordance with this invention, an access controller 200, discussed further below, controls the communication of data and/or control signals among some or all of the components of the system 100 via a common bus structure. In a preferred embodiment of this invention, an access matrix 260 identifies permitted and/or prohibited communication channels between pairs of components of the system 100. Of particular note, the access controller 200 prevents communications from the main processor 120 to select components of the system, thereby protecting these components from hackers or viruses that corrupt or replace the code that is executed by the main processor 120. As defined herein, a component is a uniquely accessible resource, and may correspond to a device, a plurality of devices, or a subset of a device. For example, select registers of a device may form one component of the system 100 while the remaining registers of the device may form another component.

A secure block 110 is provided to maintain control of the access matrix 260, independent of the main processor 120. As noted above, the access matrix 260 defines the access rights to select components of the system 100, including the access rights to itself. By identifying the secure block 110 as the only component of the system 100 that has "write" privileges to the access matrix 260, the access controller 200 will prevent any other component from modifying the contents of the access matrix 260, even though each of the components of the system 100 communicate via a common bus structure.

In a preferred embodiment, the secure block 110 is configured to allow the main processor 120 access to all non-sensitive components of the system 100, thereby allowing for an integration of functions within the system 100 while still providing protected channels to select components or functions. That is, the system 100 of this invention enjoys the advantages of a common bus structure for efficient integration of functions and modular design techniques, while still maintaining secure channels within this common bus structure.

The example secure block 110 is illustrated as comprising a security processor 111, a memory 112, an input/output component 113, a bus interface 115, and components that facilitate cryptographic processing 116, 117. As defined herein, "memory" includes any element that is configured to store one or more data items for subsequent retrieval, including ROM, RAM, registers, files, and so on. These components 111-117 are illustrated as example components in a typical embodiment of a functional block that provides secure functions, discussed further below, although a particular embodiment of a secure block 110 may include more or fewer components than those illustrated in this example embodiment.

In addition to controlling the contents of the access matrix 260, the security processor 111 is configured to provide cryptographic services, using coprocessing components 116, 117 to effect functions particular to cryptography, such as secure key generation and exchange. The input/output component 113 provides one or more input/output channels to facilitate secure communications with other security devices, such as smart cards, PIN keypads, and the like. Note that the channels provided by the input/output component 113 are isolated from the input/output channels that are provided by the input/output component 130 in the "non-secure" portion of the system 100. The bus interface 115 provides communication between the secure block 110 and the remainder of the system 100, via the common bus structure of the system 100. Because the access controller 200 is configured to enforce access rights between select pairs of components, the bus interface 115 effectively provides a secure channel to and from some components, and an open channel to and from other components, as the situation requires.

FIG. 2 illustrates an example bus access controller 200 for use in a security system in accordance with this invention, as disclosed in copending U.S. patent application "ACCESS CONTROL BUS SYSTEM", Ser. No. 10/155,265 filed 24 May, 2002 for Timothy Pontius, Rune Jensen, and Thorwald Rabeler, incorporated by reference herein. Other access control techniques may be utilized as well.

As disclosed in this copending application, the access controller 200 controls data transfers between pairs of devices in a system, based on defined access rights between an "initiator" of a data transfer request and a "target" of the request. For example, a processor is typically the initiator of a read or write request for data from or to a target memory. In the example controller 200, each initiator 210 is coupled to the controller 200 via an independent interface 216, the independent coupling serving to uniquely and securely identify each initiator. Each target, on the other hand, is coupled to the bus via a common data interface 228, and an independent interface 226 that selectively enables or disables the target for sending or receiving the information via the common data interface 228. In a preferred embodiment, the coupling to the controller is via a wired connection, such as a set of routed wires within an integrated circuit that contains the controller 200 and each of the initiators 210 and targets 220. In this manner, an attempt to substitute a bogus initiator requires a physical modification to the protected system, and security is assured from remote hackers or software viruses. The access controller 200 determines the access rights of each requested data transfer based on the contents of the access control matrix 260. As disclosed in the copending application, the actual structure of the control matrix 260 may be any of a variety of forms, including lists, registers, etc. The term matrix is used to connote that, regardless of the form of the information, a mapping of access rights between each initiator and each target can be determined.

FIG. 3 illustrates an example access control matrix 260 for identifying access rights between devices in a secured system in accordance with this invention. The rows labeled A, B, and C in this example matrix 260 correspond to the initiators, InitiatorA, InitiatorB, and InitiatorC of FIG. 2, respectively. The columns labeled 1, 2, and 3 correspond to the targets, Target1, Target2, and Target3 of FIG. 2, respectively. (Column '0' is discussed below.) In this example matrix 260, an "a" indicates that all access rights are granted, an "r" indicates that read-only access rights are granted, a "w" indicates that write-only access rights are granted, and a "-" indicates that no access rights are granted. In a simpler embodiment, the access rights may include only a binary "yes" or "no", independent of the direction of data transfer; or, all initiators may have read rights to all devices, and the access rights may merely limit the right to write data to select targets. These alternatives, and others, will be evident to one of ordinary skill in the art in view of this disclosure. For example, in a more complex embodiment, the access control matrix may include an indication of capabilities, as well as rights, such as initiator-target pairs that can effect block-data transfers, and so on.

The access control matrix 260 is preferably programmable, to allow for the creation and modification of access rights as initiators 210 or targets 220 are added or removed from the protected system. To control the access to the access control matrix 260, the access control matrix includes the column labeled "0", which, in this example, corresponds to the bus controller 200, and specifically the access control matrix 260.

As discussed above, the bus controller 200 of FIG. 2 is configured to receive data transfer requests from each initiator 210, and to selectively enable the target 220 of this data transfer request, based on the access rights indicated by the access control matrix 260. Using the example matrix 260 of FIG. 3, if InitiatorA or InitiatorC submits a data transfer request to Target3, the bus controller 200 will reject the request, and will not enable Target3 to effect the requested transfer, based on the "-" (no-rights) entry in column "3" of the access control matrix 260. In like manner, if InitiatorB requests a data transfer from Target3 to InitiatorB (i.e. a "read" request), the controller 200 will reject the request. If, on the other hand, InitiatorB requests a data transfer from InitiatorB to Target3 (i.e. a "write" request), the controller 200 will enable Target3 to receive the data, based on the "w" (write-only) entry in the access control matrix 260.

In like manner, based on the example access control matrix 260 of FIG. 2, the bus controller 200 of FIG. 1 will allow InitiatorA to read or write to the access control matrix 260, corresponding to the "a" (all-rights) entry in the first row of column "0", but will prevent each of the other initiators 210 from accessing the access control matrix 260, based on the "-" (no-rights) entry in each of the other rows of column "0". In this manner, only InitiatorA is permitted to modify the access rights between initiators 210 and targets 220. As discussed above, in accordance with the principles of this invention, Initiator A in this example corresponds to the secure block 110 of FIG. 1. The main processor 120 of FIG. 1, on the other hand, corresponds to a different initiator, and is thereby prevented from modifying the access rights between initiators 210 and targets 220.

The following paragraphs define example security processes that are provided by the security subsystem formed by the secure block 110, the access controller 200, and the access matrix 260, although other processes will be evident to one of ordinary skill in the art in view of this disclosure.

ISOLATION OF THE MAIN PROCESSOR 120 FROM SELECT COMPONENTS—

The access control matrix 260 can isolate the main processor 120 from select registers within devices and from select regions of memory. As indicated in FIG. 1, the memory of a system may be logically partitioned into distinct regions 140, 145, and the access rights to each region may differ. For example, all devices may have access to memory region 140, but the secure block 110 may be the only device that can write to memory region 145, and the decryption device 170 may be one of a select few devices that can read from this memory region 145. In a preferred embodiment, the logical partitioning of the memory is dynamic, and the access control matrix is configured to contain the upper and lower bounds of the memory space corresponding to each partition. In a preferred embodiment, the secure block 110 is also configured to allow other components to request allocations of memory space that the component can use for its private, or semi-private, use.

SECURE INJECTION OF KEYS TO CRYPTOGRAPHIC UNITS—The secure block 110 can provide one or more keys 175 to cryptographic processing devices 170, and can prevent access to these keys by any of the other components, and particularly the main processor 120. The cryptographic device 170 may be controlled by the main processor 120, and may provide encryption or decryption services on behalf of the processor 120, but only the secure block 110 will have write access to the key 175, and only the device 170 will have read access. Similarly, the source and destination of the encryption/decryption operation may be inaccessible to certain devices or processors, thereby allowing for a compartmentalization of the security processes. For example, the main processor 120 may be allowed access to encrypted content material, but access to the decrypted material might be limited to a direct memory access (DMA) device that moves the decrypted material to a display device. Note that, because only the secure block 110 can modify the access rights among devices, these security features remain in effect regardless of the corruption or replacement of the code that is executed by the main processor 120.

SECURE COMMUNICATION WITH OTHER PROCESSORS—The input/output component 113 provides for one or more communication channels that are isolated from the main processor 120. As such, the secure processor 111 can establish a secure communications channel with an external processor, such as a smart card. The smart card can provide encryption/decryption keys to the secure block 110 via this secure communications channel, and the keys can be subsequently communicated to the cryptographic device 170 via an access-controlled communication to the key device 175, as discussed above. The main processor 120 cannot compromise this secure transfer, even if the code that is executed by the main processor 120 is compromised. In like manner, the secure block 110 can receive key update messages from remote processors via the secure channels of the input/output component 113, and can allow for secure access to the system 100 by maintenance processors.

SECURE COMMUNICATION WITH EXTERNAL DEVICES—The input/output component 113 allows for communications with external devices, such as a keypad that is used for entering a personal identification number (PIN), without the PIN being observed by the main processor 120. Alternatively, the keypad may be connected to a particular port on the common input/output component 130, and access to that port may be restricted, particularly to exclude access to that port by the main processor 120. In this manner, secure channels can be established with external devices without requiring the information to flow through the secure block 110.

SECURE DOWNLOAD OF PROGRAMS OR DATA— The secure block 110 can be configured to verify the authenticity of programs or data received from the non-secure input/output port 130 before execution by the main processor 120 or other device in the system 100. Using conventional digital signature verification techniques, and devices 170-175 as necessary, the secure block 110 can restrict access to the memory 140, 145 in which the received program or data is stored until a proper verification is determined. Unless and until such verification is determined, access to the received material by the main processor 120 or other devices is prevented by the access controller 200. When the verification is received, the secure block 110 modifies the access control matrix 260 to allow access to the verified material by the appropriate devices.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the security aspects of this invention can be further enhanced via the use of a timing device to provide limited-duration access rights. A secure item, such as a decryption key for entertainment material, may be associated with a "one-day pass", or other time-based authorization. If the security processor 111 is the only device that is granted write-access to the timing device, external processes will be unable to "set the clock back" to extend the authorized time duration. Additionally, the security processor 111 may be configured to effect certain actions, such as deleting the content material and/or the decryption key, when the authorization time elapses, thereby permanently terminating the access rights to this material. These and other system configuration and optimization features will be evident to one of ordinary skill in the art in view of this disclosure, and are included within the scope of the following claims.

I claim:

1. A system comprising:
   a main processor that is configured to effect a primary function of the system,
   a plurality of components that are configured to transfer data via a bus that is common to the main processor,
   an access controller that is configured to selectively inhibit data transfers between the main processor and one or more components of the plurality of components, based on defined access rights, and
   a secure block that is independent of the main processor and is configured to define the access rights;
   wherein,
   the access controller is configured to selectively inhibit the data transfers based on contents of an access control matrix whose contents define the access rights between the main processor and the one or more components, and the secure block is configured to exclusively control the contents of the access control matrix, and the access control matrix includes a definition of access rights to the access control matrix that exclusively limit a right to modify the contents of the access control matrix to the secure block.

2. The system of claim 1, wherein the plurality of components includes a first input/output component that is operably coupled to the main processor, and the secure block includes a second input/output component that is isolated from the main processor.

3. The system of claim 1, wherein the secure block includes:
- a security processor,
- a memory, and
- an input/output component.

4. The system of claim 3, wherein the secure block further includes
- one or more elements that facilitate cryptographic processing.

5. The system of claim 1, wherein the plurality of components includes:
- a key component and
- a cryptographic component, operably coupled to the main processor, that provides a cryptographic process based on a key value contained in the key component, the secure block is configured to provide the key value to the key component, and the access controller is configured by the secure block to inhibit data transfers between the key component and the main processor via the bus, while allowing data transfers between the secure block and the key component and between the cryptographic component and the key component via the bus.

6. The system of claim 1, wherein the plurality of components includes:
- an input/output component that is configured to receive information from an external source, and
- a memory component that is configured to store the information, and the secure block is configured to:
- determine an authentication of the information, and
- deny access rights between the memory component and the main processor until the authentication is determined.

7. The system of claim 1, further including a timing device, operably coupled to the secure block, that is configured to provide measures of time duration, and wherein the secure block is configured to define one or more of the access rights based on at least one of the measures of time duration.

* * * * *